(No Model.) 2 Sheets—Sheet 1.
W. S. REEDER.
FEEDER FOR THRASHING MACHINES.
No. 349,606. Patented Sept. 21, 1886.
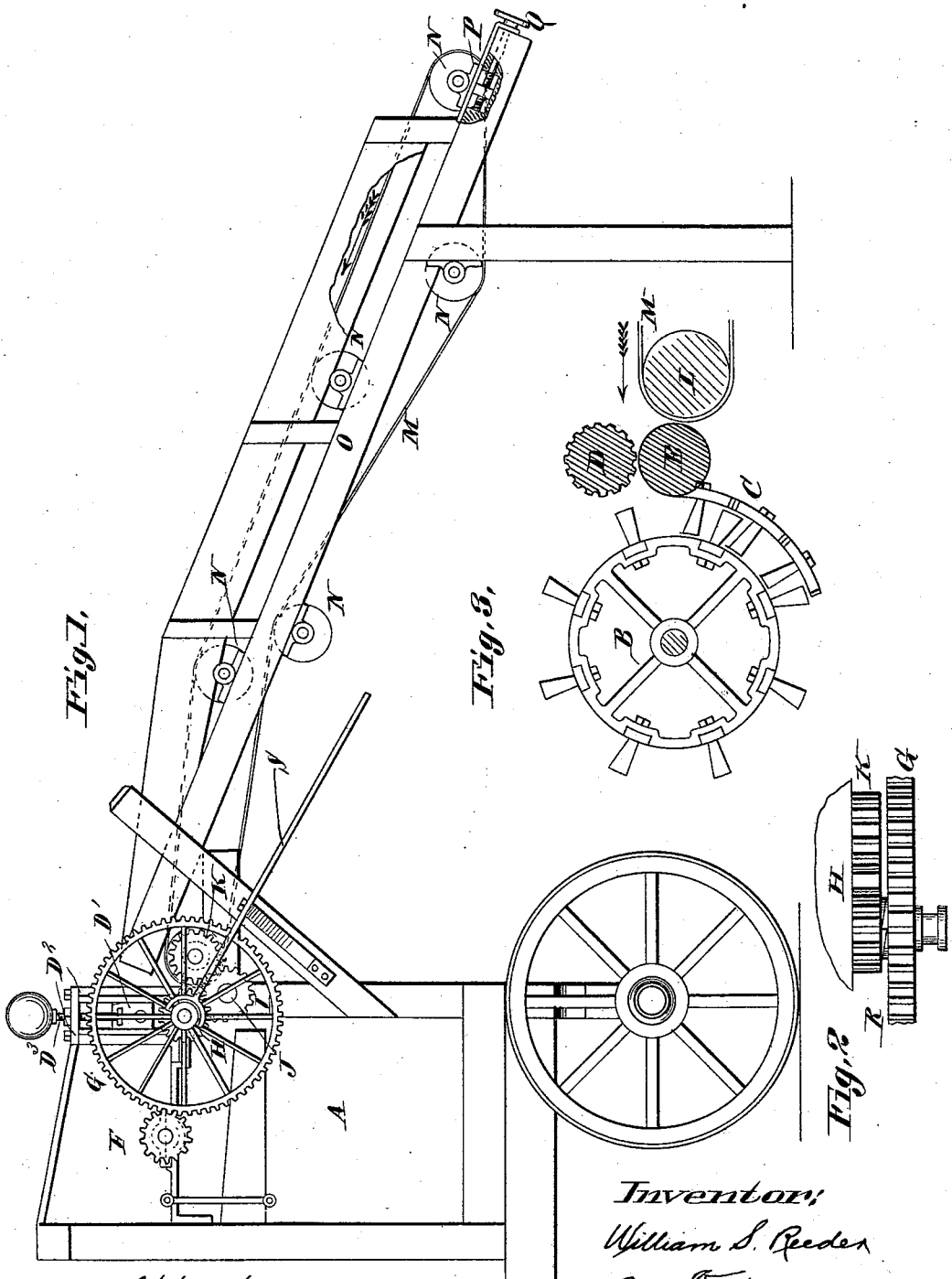
Attest:
Charles Pickles
F. A. Hopkins
Inventor:
William S. Reeder
By Knight Bros
Attys (No Model.) 2 Sheets—Sheet 2.
W. S. REEDER.
FEEDER FOR THRASHING MACHINES.
No. 349,606. Patented Sept. 21, 1886.
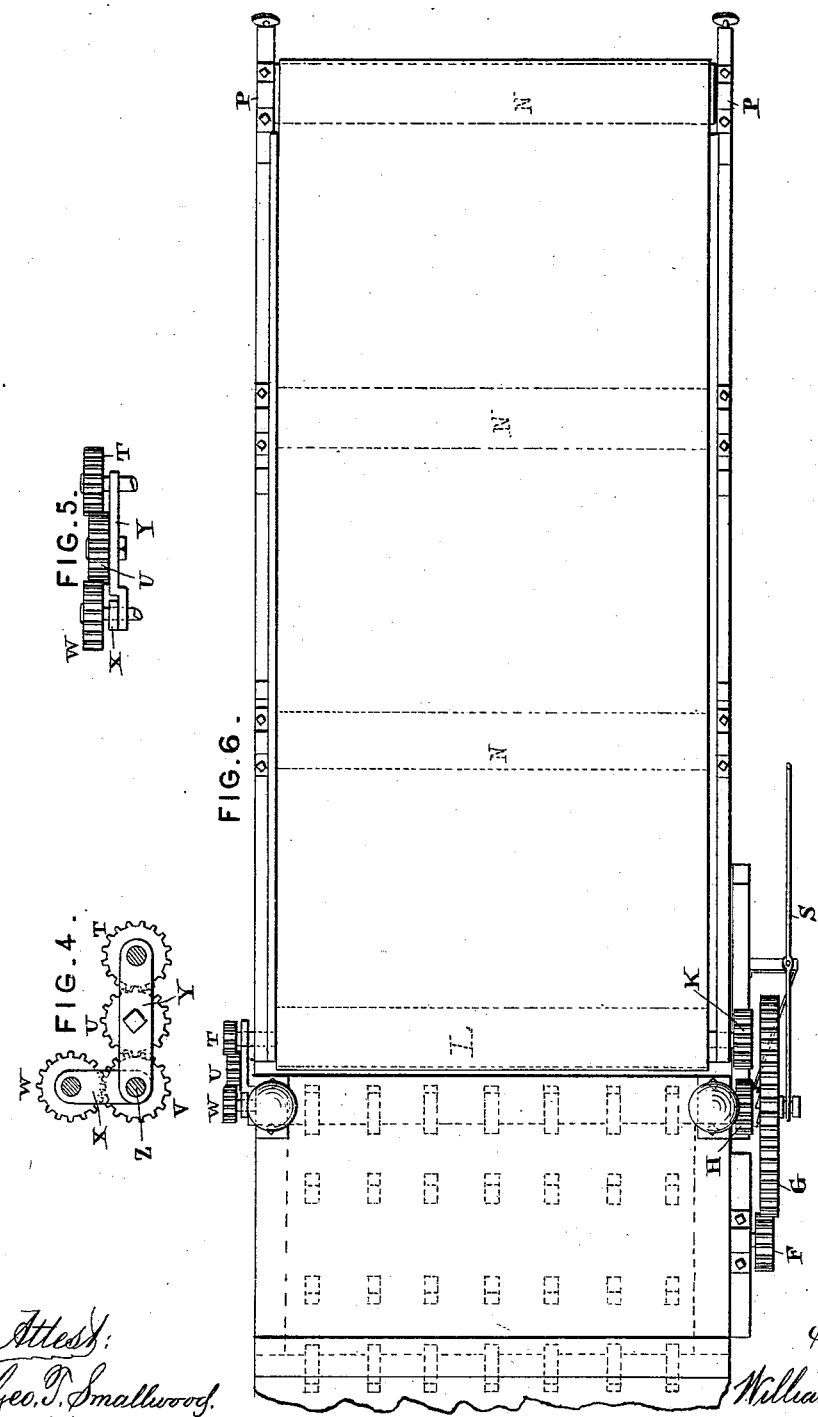

UNITED STATES PATENT OFFICE.

WILLIAM S. REEDER, OF ST. LOUIS, MISSOURI, ASSIGNOR TO THE KINGSLAND & FERGUSON MANUFACTURING COMPANY, OF SAME PLACE.

FEEDER FOR THRASHING-MACHINES.

SPECIFICATION forming part of Letters Patent No. 349,606, dated September 21, 1886.

Application filed December 7, 1885. Serial No. 184,980. (No model.)

*To all whom it may concern:*

Be it known that I, WILLIAM S. REEDER, of the city of St. Louis, in the State of Missouri, have invented a certain new and useful Improvement in Feeders for Thrashing-Machines, of which the following is a full, clear, and exact description, reference being had to the accompanying drawings, forming part of this specification, and in which—

Figure 1 is a side elevation of my improved attachment, showing the front end of the thrashing-machine. Fig. 2 is a detail view. Fig. 3 is an enlarged transverse section through the cylinder of the machine and through the feed-rolls and the upper rolls of the feed belt or apron. Fig. 4 is a section on the line 4 4, Fig. 6, showing the arrangement of cog-wheels connecting the upper roll of the apron to the upper feed-roll. Fig. 5 is a top view of the same. Fig. 6 is a plan view of the machine covered in.

My invention relates to certain improvements in rice-thrasher attachments for thrashing-machines; and my invention consists in features of novelty hereinafter fully described, and pointed out in the claims.

Referring to the drawings, A represents part of a thrashing-machine with the usual cylinder, B, and concave C.

D represents the upper and E the lower feed-rolls of my improved attachment. The upper roll is preferably corrugated, as shown in Fig. 3, and the lower roll is preferably made smooth, as shown in said figure. The rice is fed between these rolls to the cylinder of the machine uniformly. I drive these rolls from the cylinder of the machine by means of the connection which I will now describe.

F represents a pinion on one end of the shaft of the cylinder, meshing into a cog-wheel, G, on end of the shaft or gudgeon of the lower feed-roll, E. On this shaft is also a pinion, H, meshing into an idler, I, supported on a short shaft or journal, J. This idler meshes into a pinion, K, secured to one end of the shaft or gudgeon of the upper roll, L, of the feed-apron. The apron M extends around this roller and over roller N, arranged on a suitable conveyer box or case, O, the lower roll, N, being journaled in boxes P, through which pass screw-threaded rods Q, to permit of the boxes being moved in or out, thus allowing the roller to be shifted to or from the machine for the purpose of keeping the belt or apron taut. It will thus be seen that the lower feed-roll and the apron are driven in the proper direction from the cylinder of the machine.

The cog-wheel is preferably loose on its shaft, and is provided with a clutch, R, as shown in Fig. 2, operated by a lever, S, so as to permit of the wheel being thrown into and out of gear. The upper feed-roll, D, is also driven from the cylinder of the machine by being connected to the drum or roller L by means of a cog-wheel, T, on the shaft or gudgeon of said roller. On the opposite end from the cog-wheel K said pinion meshes into an idler, U, which in turn meshes into another idler, V, and this idler V meshes into a similar pinion, W, on the shaft or gudgeon of the upper roller, D. These pinions V and W are journaled to bars X and Y, united by means of a pivot-connection, Z. The object of this arrangement is to allow the upper feed-roll to rise and fall and to accommodate itself to the amount of material passing between the rolls, and at the same time not interfere with the driving-gearing. The roll is supported in journal-boxes D', held between guides D², which permit of their vertical adjustment, and they may be adjusted by means of vertical screws D³, as shown in Fig. 1. It will thus be seen that I am able to drive this upper feed-roll as well as the lower feed-roll and the apron from the cylinder of the machine, thus dispensing with an auxiliary motor, as has been the common practice in these machines.

By means of a connection between the roller of the apron and the upper feed-roll, the latter may rise and fall to accommodate itself to the amount of material passing through without interfering with the connection.

I claim as my invention—

1. In combination with the cylinder of a thrashing-machine, the upper and lower feed-rolls, gearing connecting the cylinder to the lower feed-roll, the feed-apron, gear-wheels connecting the lower feed-roller to the upper roller of the apron, and gearing connecting the upper roller of the apron to the upper feed-roll, substantially as shown and described.

2. The combination, with the cylinder of a thrashing-machine, of the lower feed-roll, gearing connecting the cylinder to the said feed-roll, the feed-apron, rollers upon which the apron is supported, gearing connecting the said feed-roll to the upper apron-roll, the upper feed-roll, gearing connecting the said apron-roll to the upper feed-roll, and jointed bars supporting the gearing, substantially as shown and described, for the purpose set forth.

WILLIAM S. REEDER.

In presence of—
GEO. H. KNIGHT,
BENJN. A. KNIGHT.